(12) United States Patent
Granderson et al.

(10) Patent No.: US 6,340,177 B1
(45) Date of Patent: Jan. 22, 2002

(54) ATV LIQUID TRANSPORT APPARATUS

(76) Inventors: Daniel Dean Granderson, 1266 Bell Rd., Chandler, IN (US) 47610; Christopher Dorman Curry, 5766 Schultz Rd., Elberfeld, IN (US) 47613

( * ) Notice: Subject to any disclaimer, the term of this patent is extended or adjusted under 35 U.S.C. 154(b) by 0 days.

(21) Appl. No.: 09/659,730

(22) Filed: Sep. 11, 2000

Related U.S. Application Data

(60) Provisional application No. 60/157,196, filed on Sep. 30, 1999.

(51) Int. Cl.[7] .................................................. B60P 3/22
(52) U.S. Cl. ...................... 280/833; 280/835; 280/838; 169/24
(58) Field of Search .......................... 280/4, 830, 831, 280/832, 833, 834, 835, 836, 837, 838, 839; 169/14, 24, 52; 137/267; 220/562, 564; D12/13; 293/117, 106; 296/198

(56) References Cited

U.S. PATENT DOCUMENTS

| | | | |
|---|---|---|---|
| 3,645,349 A | * | 2/1972 | Nichter ...................... 180/6.48 |
| 4,149,734 A | * | 4/1979 | Sylvester ...................... 280/833 |
| 4,488,603 A | * | 12/1984 | Schmittmann et al. ........ 169/24 |
| 4,593,855 A | * | 6/1986 | Forsyth ........................ 239/74 |
| D286,864 S | * | 11/1986 | Lanzdorf et al. ............ D12/13 |
| 4,799,569 A | * | 1/1989 | Hattori et al. ............... 280/833 |
| 4,917,193 A | * | 4/1990 | Ockler ......................... 169/24 |
| 5,476,146 A | * | 12/1995 | Brown ......................... 169/24 |
| 5,488,995 A | * | 2/1996 | Kuwahara ................... 180/234 |
| 5,573,300 A | * | 11/1996 | Simmons ............... 280/DIG. 5 |
| 6,029,750 A | * | 2/2000 | Carrier ......................... 169/52 |

FOREIGN PATENT DOCUMENTS

| | | | | |
|---|---|---|---|---|
| FR | 2332926 | * | 1/1993 | ................. 280/833 |
| JP | 5016681 | * | 1/1993 | ................. 280/834 |

* cited by examiner

Primary Examiner—Daniel G. DePumpo
(74) Attorney, Agent, or Firm—Mark Manley; George Morgan

(57) ABSTRACT

The present invention is a liquid transport apparatus which is attachable to a typical four wheel all terrain vehicle, popularly called an ATV. The apparatus comprises a rear tank, a forward tank, a pump, hoses and fittings connecting the tanks to each other and the pump, and a dispensing hose. The result is a relatively low profile apparatus when it is installed on a four wheel all terrain vehicle.

3 Claims, 6 Drawing Sheets

ATV LIQUID TRANSPORT APPARATUS

CROSS REFERENCES TO RELATED APPLICATIONS

Provisional Application for Patent No. 60/157,196 of Sep. 30, 1999, with the same title, "ATV Liquid Transport Apparatus: which is hereby incorporated by reference. Applicant claims priority pursuant to 35 U.S.C. Par. 119(e) (i).

STATEMENT AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

This invention relates to an apparatus that when added to a typical four wheel all terrain vehicle is useful for transporting liquids. This is of value in fighting fires in relatively inaccessible areas such as forests and meadows.

2. Background Information

Transporting liquids such as, but not restricted to, water into off-road locations can be a problem for individuals, campers, and volunteer fire departments. Currently, many firefighters have to lug five gallon cans of water to fight fires in woodland locations. As volunteer fire fighters often tend to be middle aged, this is a problem area.

U.S. Pat. No. 5,476,146, Brown, Dec. 19, 1995 addressed this in his invention, a Fire Fighting All Terrain Vehicle. However, Brown's invention tends to be top heavy and might have stability problems negotiating some inclines.

As will be seen from the subsequent description, the preferred embodiments of the present invention overcome these and other shortcomings of existing liquid transport apparatuses.

SUMMARY OF THE INVENTION

The present invention is a low profile liquid transport apparatus which is attachable to the frame and structure of a typical four wheel all terrain vehicle, said vehicle typically referred to as a four wheel ATV. The liquid transport apparatus is directed to, but not restricted to, transporting water to, and dispersing water on, a fire at a location that is not easily accessible by conventional fire trucks. The transport apparatus can also be used to transport foam for fighting fires, or potable water for consumption purposes. The apparatus comprises a forward tank, a rear tank, hoses and fittings connecting said tanks, a check valve, a shut off valve, an electrically powered pump, a lever operated spray nozzle, a dispensing hose, a hose reel, and a support frame, said support frame supporting the hose reel, hose, electrically powered pump, and lights. Said support frame complements and is attachable to the typical four wheel ATV. Said tanks comprise equipment tie down rails, vent pipes, tank mounts, caps, and fenders. The rear tank attaches to the frame and structure of the ATV and wraps around a seat of the ATV. The front tank has a recess that complements the ATV gas tank and handlebars. The electrically operated pump is powered by the ATV's battery. The tanks replace the original fenders, racks, and front lights of the ATV upon which the tanks are mounted. This results in a lower profile for the ATV liquid transport apparatus as installed on an ATV. As the support frame supporting the hose reel, hose, and pump is at the front of the ATV, at the bottom edge of the front tank, this also helps maintain a lower profile. A low profile for the ATV liquid transport apparatus is highly desirable for achieving a low center of gravity for the combination of said apparatus and an ATV upon which it is installed, so as to avoid stability problems in negotiating the inclines to be expected in rough terrain.

DESCRIPTION OF THE PREFERRED EMBODIMENTS

Figure 1:
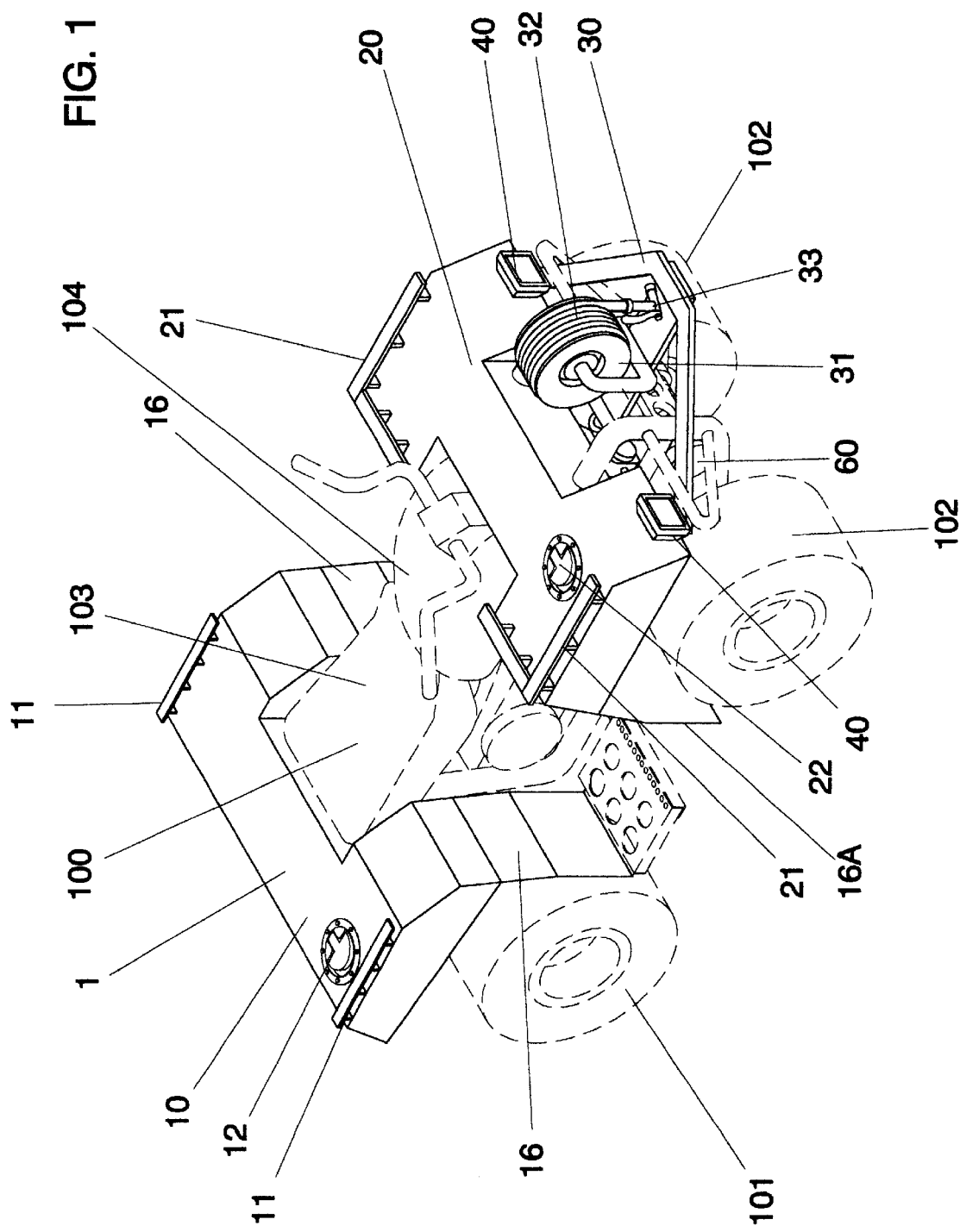
FIG. 1 is a view of the preferred embodiment of the present invention, a liquid transport apparatus installed on an ATV.
Figure 2:
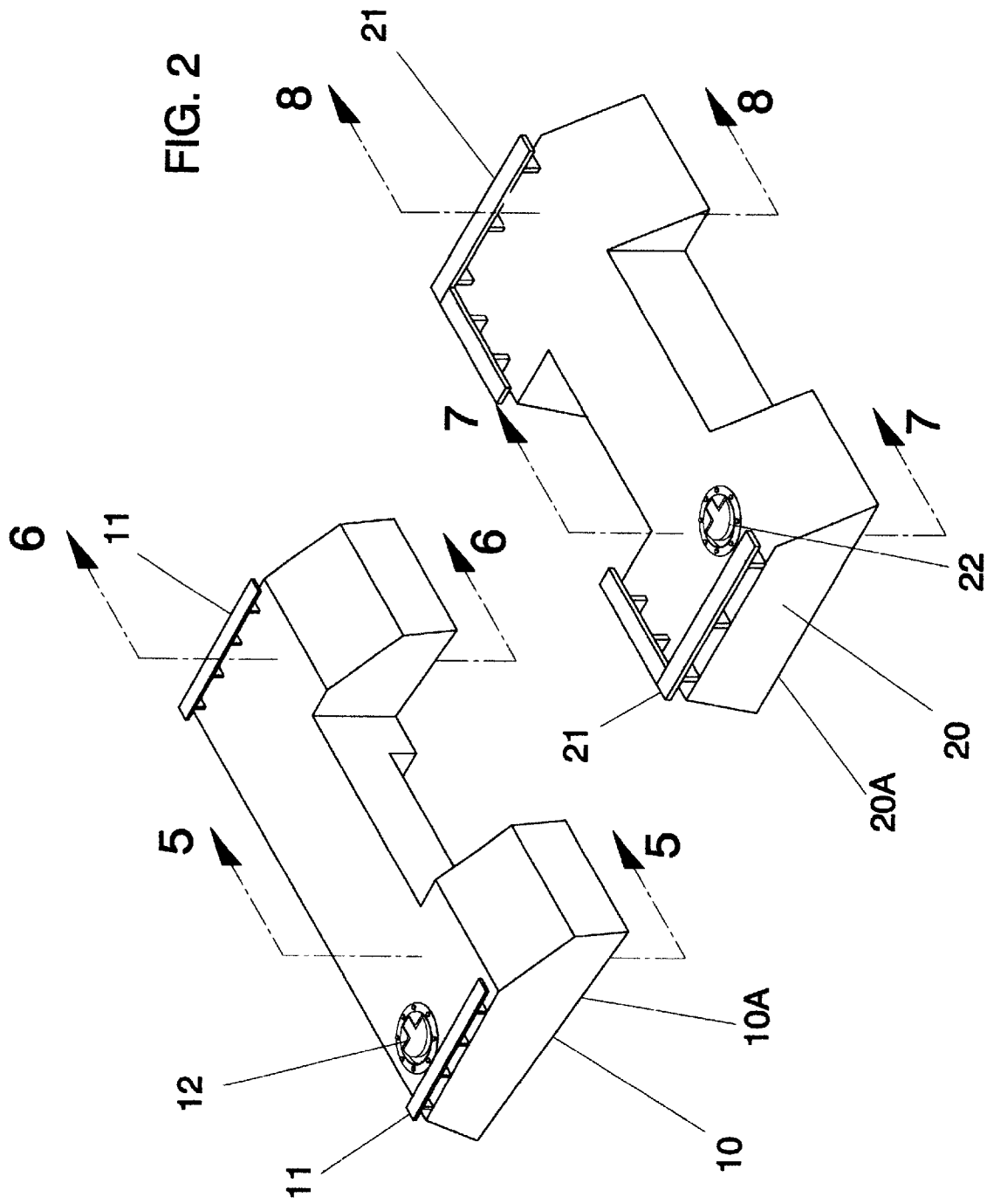
FIG. 2 illustrates front and rear tanks.

As shown in FIGS. 1, 2, 3 and 4, the preferred embodiment of the present invention, a low profile wheeled vehicle liquid transport apparatus 1, that is attachable to a prior art ATV 100 comprises a rear tank 10, a forward tank 20, a frame support 30, an electrically powered pump 35, a hose reel 31, a dispensing hose 32, a dispensing nozzle 33, connecting hoses 50, and connecting T fittings 52. The connecting hoses 50 and the connecting T fittings connect the rear tank 10 and the forward tank 20 to each other and to said pump 35. The tanks 10 and 20 replaced the ATV 100's original front and rear fenders, a lower profile results than would have been the case if the apparatus 1 had merely been added on top of the ATV 100. A lower profile means a lower center of gravity, which is desirable in rough terrain. The tanks 10 and 20 attach to the frame and structure of the ATV 100 by tank mounts 15 and complement the frame and structure of the ATV 100, wrapping around portions of the ATV 100, including the seat 103.

Referring to FIGS. 1, 2, 4, 5, and 6, the rear tank 10 comprises rear equipment tie down rails 11, a rear tank filler cap 12, a rear outlet 14, tank mounts 15, and rear fenders 16. The rear outlet 14 permits liquid in the rear tank 10 to flow into hoses 50 connected to said rear outlet 14. The tank mounts 15 permit attachment of the rear tank to the ATV 100.

The rear tank 10 replaced the ATV 100's original rear fenders and racks, serving the same function as the original rear fenders and racks, mounted on the ATV 100 with said rear tank 10 recessed so it complements the ATV's seat. This achieves a lower profile than if said rear tank 10 was merely mounted on top of the ATV.

The rear tank 10 has a bottom surface 10A that forms at least a portion of the rear fenders 16 so when said apparatus 1 is placed on a vehicle, such as the prior art ATV 100, the rear tank 10 covers the rear wheels 101 of said vehicle such that the rear tank 10 protects an operator seated on the vehicle from material flying off said rear wheels 101.

The support frame 30 comprises mount holes 34 as a convenience for mounting the support frame 30 to an ATV 100 with bolts. The support frame 30 supports lights 40, the electrically operated pump 35, a strainer 36, the hose reel 31 and the dispensing hose 32 with the spray nozzle 33.

Figure 4:
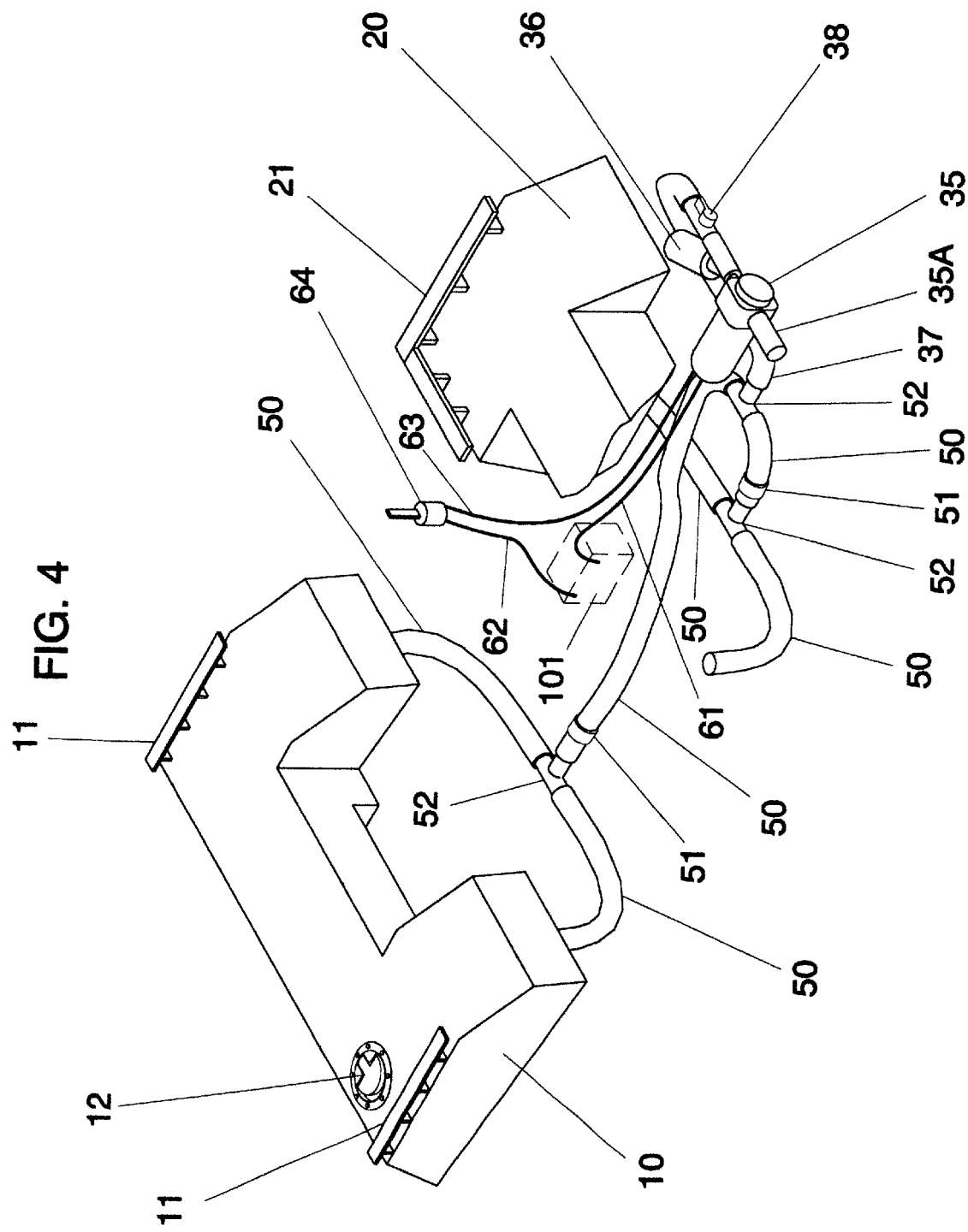
FIG. 4 illustrates the front and rear tanks with hoses, fittings, and a water pump.
Figure 5:
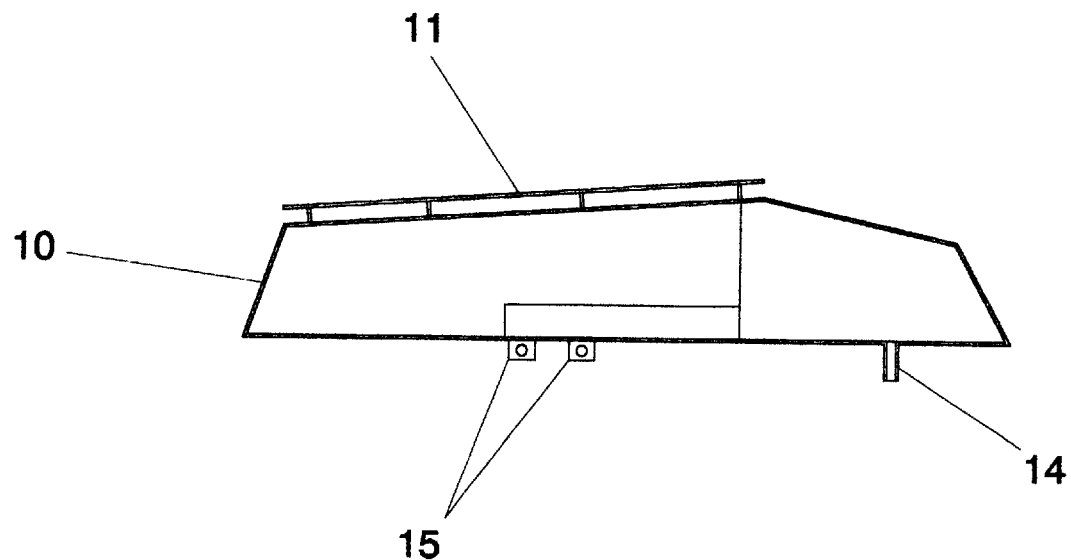
FIGS. 5 and 6 illustrate the rear tank.
Figure 6:
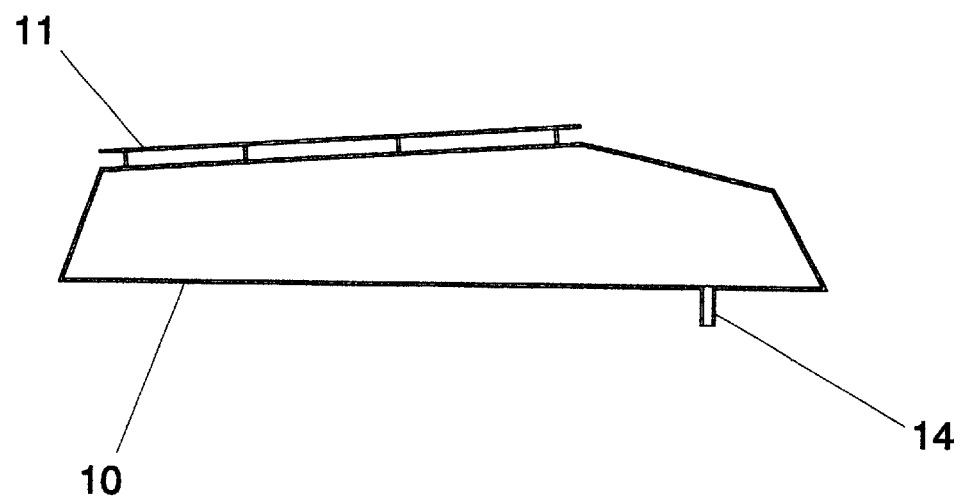
Figure 7:
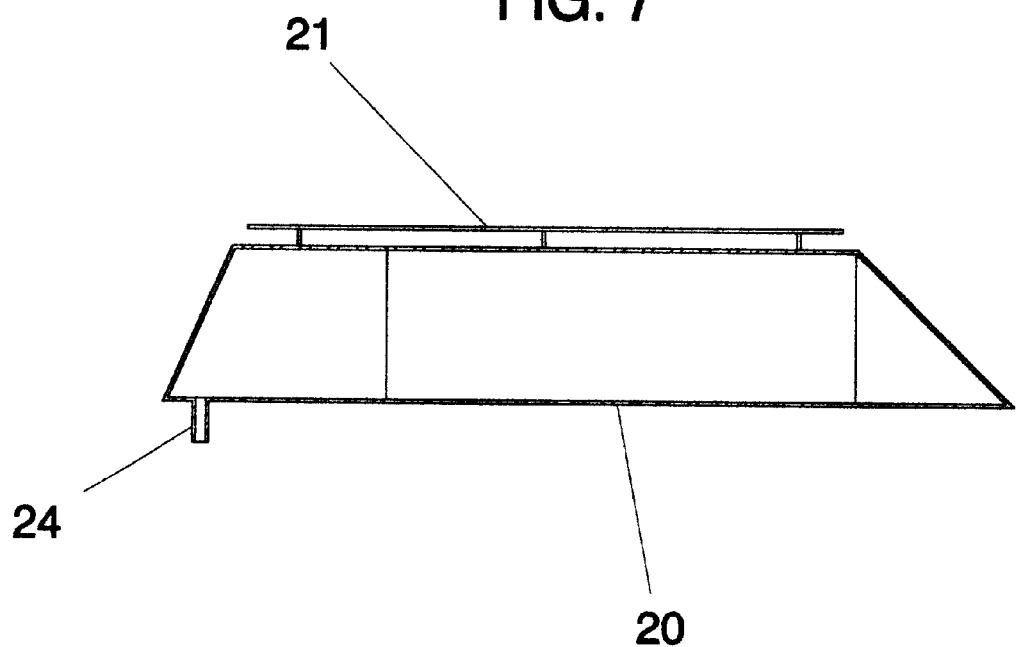
FIGS. 7 and 8 illustrate the front tank.
Figure 8:
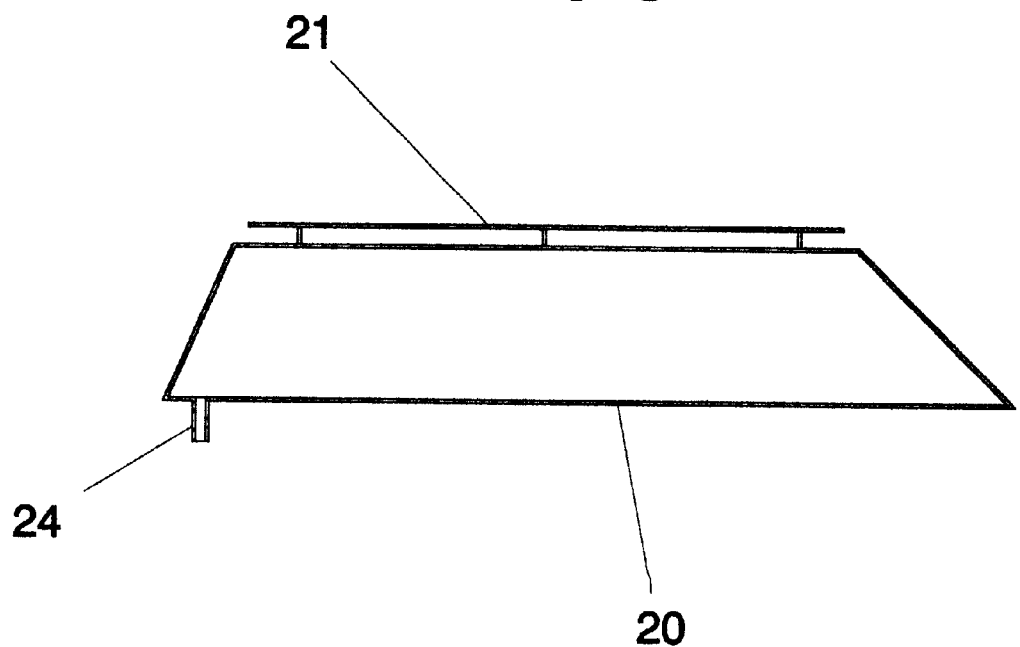

In the preferred embodiment of the present invention, further apparatus 1 further comprises a one way check valve 50 between said tanks 10 and 20, a shut off valve 38, a pump outlet connection 35A, and a hose reel liquid supply hose 37 (Ref. FIG. 4).

Figure 3:
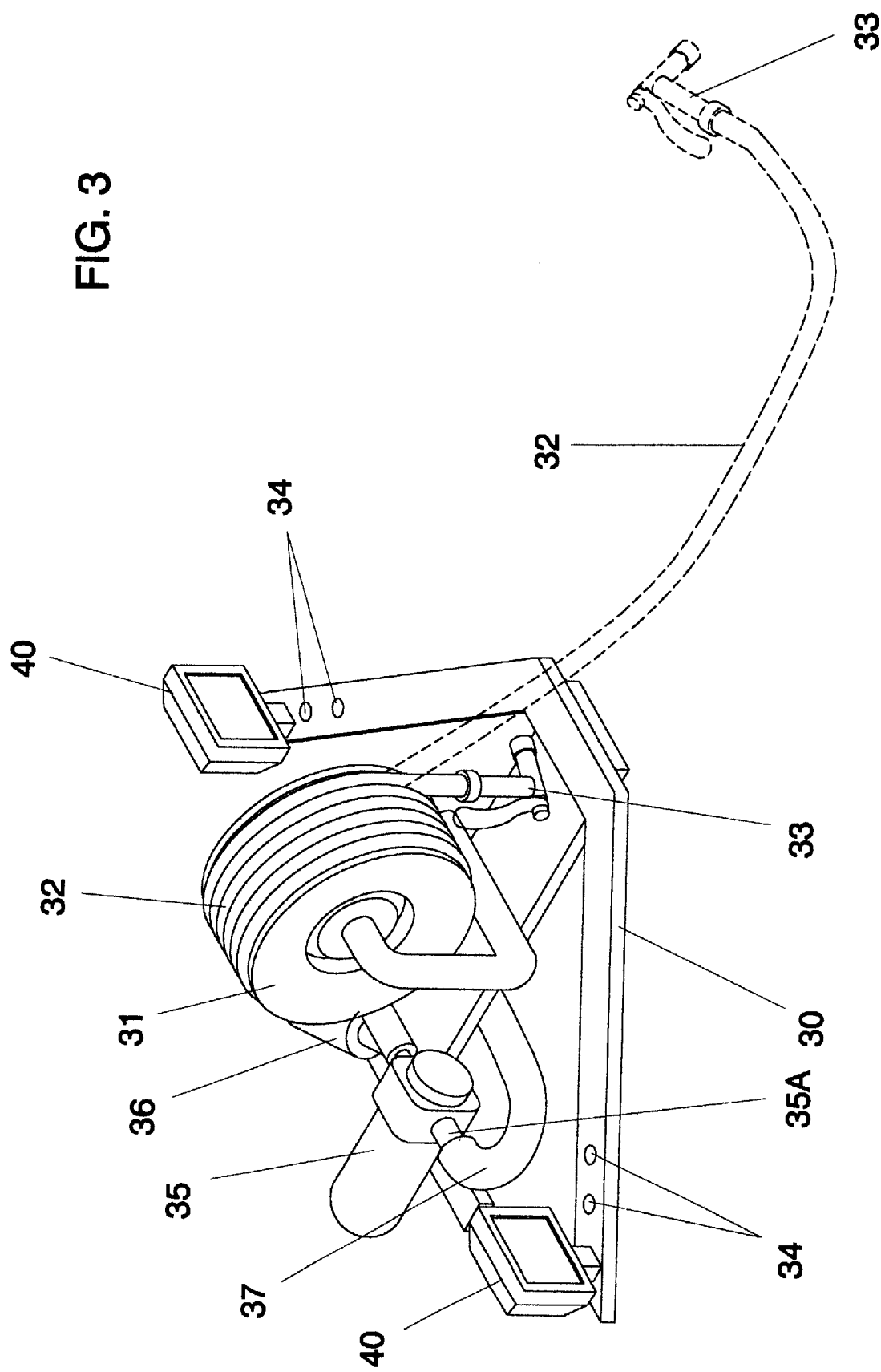
FIG. 3 illustrates a support frame.

In the preferred embodiment of the present invention, the spray nozzle 33 is a lever operated spray nozzle 33. However, as obvious to anyone skilled in the art, other types of nozzles would suffice, albeit perhaps not as well. The strainer 36 as well as the lights 40 are optional componentry. As the original ATV lights were molded in the original ATV fender, aftermarket lights 40 were installed on the support frame as replacement lights for the original ATV lights. If one wants lights 40, the support frame 30 serves as a convenience mount. As shown in FIG. 3, a hose real liquid supply hose 37 connects from a pump outlet connection 35A to the hose reel 32.

Referring to FIGS. 1, 2, 4, 7, and 8, the forward tank 20 comprises forward equipment tie down rails 21, a forward tank filler cap 22, a forward outlet 24, fenders 16A, and tank mounts 15. The forward outlet 24 permits liquid in the forward tank 20 to flow into hoses 50 connected to said forward outlet 24.

The forward tank 20 replaced the ATV's front fenders and racks, serving the same function. The forward tank 20 is recessed so said forward tank 20 complements the ATV's gas tank 104, which permits a lower profile, which means a lower center of gravity, than would have been the case if said forward tank 20 was merely added on top of the ATV 100.

The forward tank 20 has a bottom surface 20A which forms at least a portion of the fenders 16A so when the apparatus 1 is placed on a vehicle, such as the prior art ATV 100, the bottom surface 20A covers prior art front wheels 102 of said vehicle such that it protects an operator seated on the vehicle from material flying off said front wheels 102.

Referring to FIG. 4, the preferred embodiment of the present invention, the ATV liquid transport apparatus 1 further comprises a ground wire 61, a switch positive wire 62, a switch 64, and a switch to pump positive wire 63 wherein the switch positive wire 62 connects a prior art battery 101 to the switch 64 while the switch to pump positive wire 63 connects the switch 64 to the electrically operated pump 35. A ground wire 61 grounds the electrically operated pump 35 to said battery 101.

The tanks 10 and 20 can be fabricated as collapsing fuel tanks of a rubberized fabric, as is known in the trade or they can be fabricated of a suitable metal or plastic. Mild steel worked fine for the prototype.

Although the description above contains many specificities, these should not be construed as limiting the scope of the invention but as merely providing illustrations of some of the presently preferred embodiments of this invention.

As an example, the support frame 30 comprises mount holes 34 for bolting the support frame 30 onto the ATV 100. The support frame 30 could be attached to the ATV 100 a number of different ways, including welding.

Thus the scope of the invention should be determined by the appended claims in the formal application and their legal equivalents, rather than by the examples given.

We claim:

1. A low profile four wheel all terrain vehicle liquid transport apparatus comprising;

a rear tank, a forward tank, a pump, a vehicle gas tank, handlebars, hoses and fittings connecting said tanks to each other and said pump, and a dispensing hose, wherein said rear tank attaches to a frame member of the all terrain vehicle and wraps around a rear seat of said vehicle;

and wherein said forward tank has a recess that complements said vehicle gas tank and handlebars, thereby holding vehicle center of gravity to a minimum.

2. A low center of gravity four wheel all terrain vehicle liquid transport apparatus comprising;

a seat, a fuel tank, a rear liquid tank, a forward liquid tank, a pump, a vehicle frame, hoses connecting said liquid tanks to each other and to said pump, and a dispensing hose, wherein the rear tank attaches to the vehicle frame and wraps around the seat of the vehicle, and wherein said forward tank has a recess that complements said vehicle's fuel tank, thereby holding the vehicle center of gravity low.

3. The four wheel all terrain vehicle liquid transport apparatus of claim 2 further comprising;

a hose reel and a support frame, wherein said support frame supports said pump, said hose reel and said dispensing hose, wherein said hose reel is mounted adjacent to said front tank.

* * * * *